United States Patent [19]

Crouillere

[11] 4,345,556
[45] Aug. 24, 1982

[54] PROCESS FOR THE REDUCTION OF NOXIOUS GASES FROM CARBURETOR-EQUIPPED INTERNAL COMBUSTION ENGINE DURING DECELERATION PERIODS AND APPARATUS FOR APPLYING SAID PROCESS

[75] Inventor: Jean P. Crouillere, Taverny, France

[73] Assignee: Regie Nationale des Usines Renault, Boulogne-Billancourt, France

[21] Appl. No.: 154,764

[22] Filed: May 30, 1980

[30] Foreign Application Priority Data

Jun. 19, 1979 [FR] France .................................. 79 15677

[51] Int. Cl.³ .................... F02D 1/04; F02B 75/10; F02D 11/08; F02M 1/14
[52] U.S. Cl. .................................. 123/327; 123/339; 123/328
[58] Field of Search ............... 123/327, 328, 339, 340, 123/360, 585, 586, 587

[56] References Cited

U.S. PATENT DOCUMENTS

| | | | |
|---|---|---|---|
| 3,914,619 | 10/1975 | Talmage et al. | 307/129 |
| 3,999,524 | 12/1976 | Kobayashi et al. | 123/328 |
| 4,060,063 | 11/1977 | Hirasawa | 123/328 |
| 4,123,903 | 11/1978 | Hayashi | 60/277 |
| 4,168,681 | 9/1979 | Kawai et al. | 123/339 |
| 4,178,890 | 12/1979 | Yamabe et al. | 123/327 |
| 4,237,838 | 12/1980 | Kinagawa et al. | 123/327 |
| 4,242,994 | 1/1981 | Keely | 123/339 |

FOREIGN PATENT DOCUMENTS

| | | |
|---|---|---|
| 2046436 | 6/1971 | Fed. Rep. of Germany . |
| 1526125 | 5/1968 | France . |
| 54-150522 | 11/1979 | Japan .................................. 123/339 |

Primary Examiner—Raymond A. Nelli
Attorney, Agent, or Firm—Oblon, Fisher, Spivak, McClelland & Maier

[57] ABSTRACT

A method and apparatus for the reduction of emissions of noxious gases from a carburetor-supplied internal combustion engine for use with an automotive vehicle during periods of deceleration is disclosed. The positioning of one or more butterfly gas valves controlling the flow of gases into the engine is controlled such that during periods of deceleration the gas valves are partially opened in proportion to both the speed of the engine and the level of vacuum in the intake manifold of the engine.

4 Claims, 4 Drawing Figures

PROCESS FOR THE REDUCTION OF NOXIOUS GASES FROM CARBURETOR-EQUIPPED INTERNAL COMBUSTION ENGINE DURING DECELERATION PERIODS AND APPARATUS FOR APPLYING SAID PROCESS

BACKGROUND OF THE INVENTION

1. Field of the Invention

The present invention relates to a process for reducing the emission of noxious gases from an automobile powered by a carburetor-equipped internal combustion engine during deceleration periods and to an apparatus for applying the same.

2. Description of the Prior Art

It is known that, despite attempts to improve the quality of carbureted mixtures delivered to an engine by one or more single or multi-barrel carburetors, it is difficult to obtain overall satisfactory results because of the overly high quantities of noncombusted fuel emitted during deceleration. Deceleration is understood to be any period where the driver of the vehicle has ceased all action by the accelerator on the butterfly gas valves and, while applying the brakes or not, allows the car to drive the engine through the transmission as normally set up, whether the transmission is an automatic gearbox or a classic mechanical gearbox with gears and clutch completely engaged.

It is also recognized that a considerable reduction in the amount of noncombusted fuel emitted in the exhaust gas during deceleration is obtained when the vacuum in the intake manifold is limited by an adjustment of the return position of the butterfly valve or valves when the pressure on the accelerator is ceased.

Various means are known and used which enable this vacuum limitation to be achieved by moving the closing stop of the butterfly valve in the direction of a wider opening. A first mechanism includes a membrane subjected to the vacuum of the engine, with the operation of the membrane being tied to the vacuum itself, for example, by means of a calibrated valve, so that it operates only above a certain value of vacuum.

Another improved device is remarkable in that the movable stop limiting the closing of the butterfly gas valves of the engine connected to an activation mechanism, whether vacuum operated, electromagnetic, or otherwise, in combination with a control mechanism operatively connected to a rotating element of the engine. The control mechanism and its connection with the rotating element are adapted in such a way that the activation mechanism acts to move the stop from its inactive rest position only when the speed of the engine is higher than a given minimum value.

In one embodiment, the activation mechanism includes an actuator placed, through a three-way solenoid valve, in communication with the atmosphere or with the intake manifold of the engine, while the control mechanism is either a centrifugal switch or other mechanism operatively connected to a tachymetric alternator driven by the crankshaft of the engine.

These prior art devices all have the drawback of being all-or-nothing systems, which reduces their efficiency.

SUMMARY OF THE INVENTION

Accordingly, one object of the present invention is to provide a novel system which eliminates the disadvantages of the prior art all-or-nothing systems.

The present invention concerns first a process for reducing the emission of noxious gases from an internal combustion engine supplied by a carburetor and intended to power an automotive vehicle, through a reduction of the quantities of noncombusted fuels occurring during deceleration by limiting the closing of the butterfly gas valves of the engine. The process is notable in that, during deceleration phases, a partial opening of the butterfly valve is induced, which is proportional to both the speed of the engine and the vacuum in the manifold.

The invention next concerns a device for reducing the emission of noxious gases from an internal combustion engine supplied by a carburetor and intended to power an automotive vehicle, through a reduction of the quantities of noncombusted fuels occuring during deceleration by limiting the closing of the butterfly gas valves of the engine, through an application of the above process, using a three-way solenoid valve communicating with the intake manifold of the engine and a membrane chamber connected operationally to the butterfly valve. The device is notable in that it includes a mechanism for activating the butterfly valve, which includes the connection in series of the membrane chamber, the three-way solenoid valve, and a modulated cyclic ratio generator for supplying the three-way solenoid valve.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
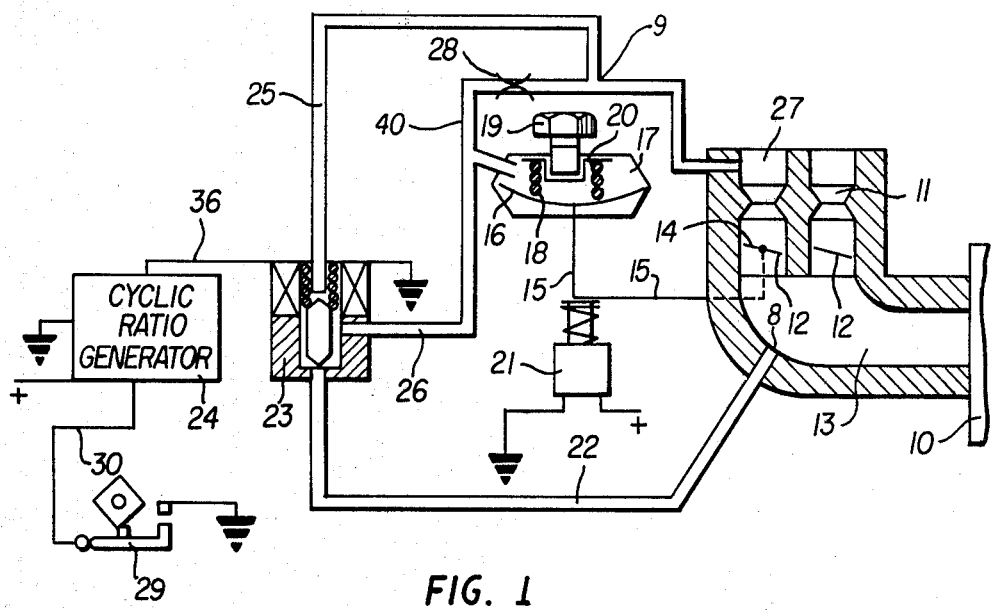
FIG. 1 illustrates an embodiment of the device for reducing noncombusted fuel according to the present invention.

Referring now to the drawings, wherein like reference numerals designate identical or corresponding parts throughout the several views, and more particularly to FIG. 1 thereof, an embodiment of the present invention is illustrated as being applied to an automotive vehicle including an engine 10 which is supplied by a carburetor such as a two-barrel carburetor 11. In the illustrated embodiment acceleration is controlled by a driver using the usual butterfly valve 12 located in the intake manifold 13 which turns on a fixed axis 14 within the manifold 13. The axis 14 is connected to the accelerator pedal (not shown) by a suitable mechanism such as a lever and wire linkage.

The pivot axis 14 of each of the butterfly valves 12 is further connected by a link 15 to a membrane 16 of a chamber 17 which is separated into two compartments by the membrane 16. The rest position of membrane 16 is set using a compensation spring 18 and a screw 19 which may depress plate 20 to a greater or lesser degree and as a result acts to compress spring 18 to a greater or lesser degree against membrane 16. In the path of link 15, and in parallel relation therewith, is located an electromagnet 21 which, when its coil is excited by the current passing through it from ground to the plus terminal of the battery, attracts link 15 and enables a partial opening of the butterfly valves 12 to be maintained. This excitation circuit is actuated when the pressure in the manifold 13 is less than 300 g/cm$^2$.

A modulating three-way solenoid valve 23 is further connected through a first hose 22 to the intake manifold 13 at a first point 8 downstream from the two barrel carburetor 11, on the one hand, and, on the other, through a second hose 25 upstream at a second point 27 of the two barrel carburetor 11, and finally, through a third hose 26 to the compartment of the chamber 17 containing the compensation spring 18. A fourth hose 40 joins the second hose 25 before the latter enters the upstream portion 27 of the intake manifold 13 at a third point 9. Before the point at which it joins second hose 25, the fourth hose 40 contains a restriction 28 corresponding to an escape. The restriction assures a return to the proper idle speed. The operation of the solenoid valve 23 is controlled by an electronic unit 24 connected through conductor 30 to a breaker point assembly 29 which controls the ignition of the vehicle. The solenoid valve 23 may be a standard type such as the HOLLEY R 88-64A.

Figure 4:
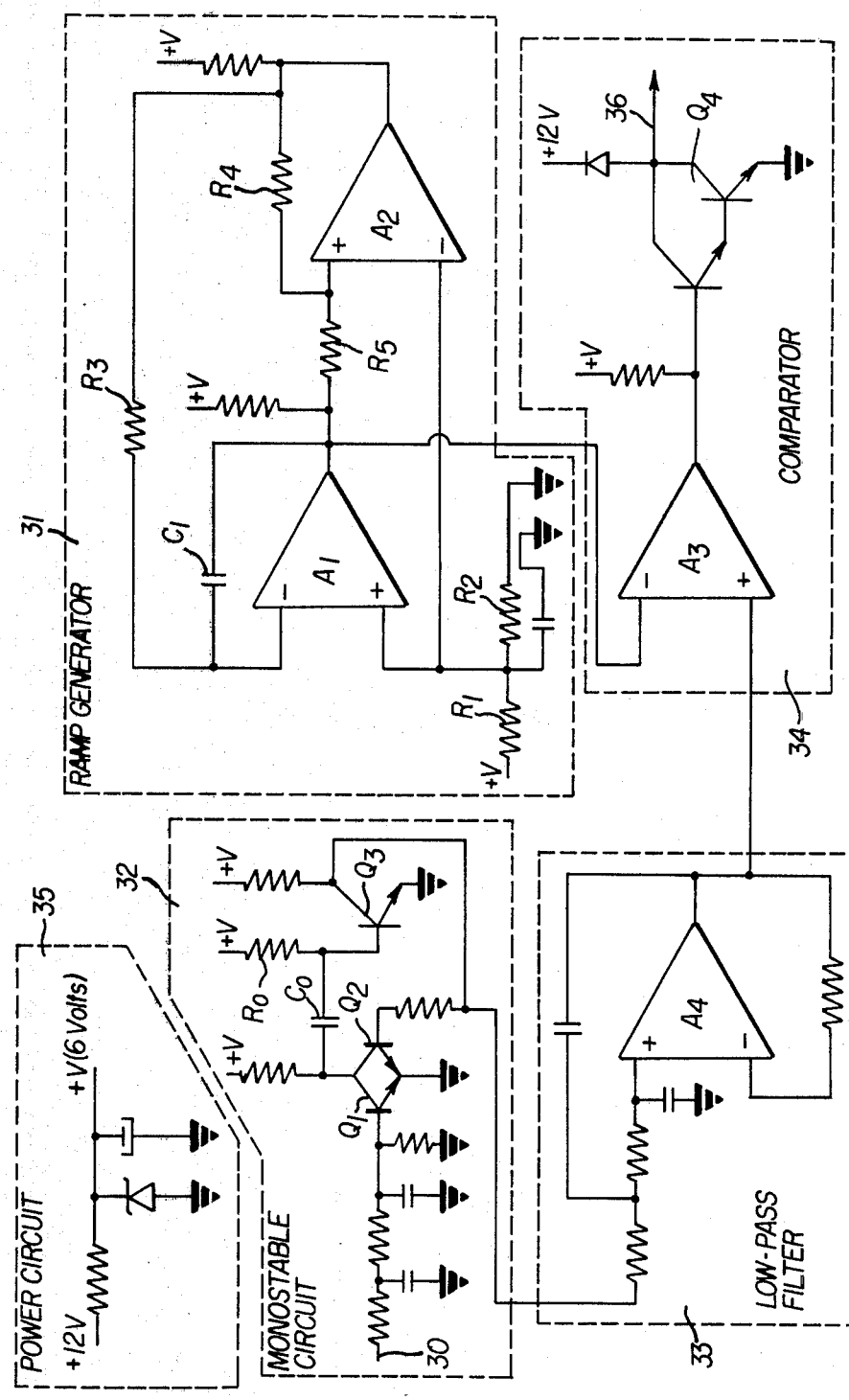
FIG. 4 illustrates an embodiment of the electronic circuits contained within unit 24 shown in FIG. 1.

FIG. 4 illustrates a non-limitative embodiment of the control unit 24 which is a cyclic ratio generator, the operation of which is a function of the speed of the vehicle communicated via the conductor 30 to a monostable circuit 32. The output of the monostable circuit 32 is connected to a low-pass filter 33 including an operational amplifier A$_4$ and set to 5 hertz. The output of this low-pass filter is connected to one input of a comparator 34, the second input of which is connected to the output of a ramp generator 31. The output 36 of the comparator 34 is connected to the control and excitation coil of the solenoid valve 23 of FIG. 1. The various inputs marked +V in the monostable circuit 32, the ramp generator 31, and the comparator 34 are connected in parallel to the output of a power circuit 35, illustrated at the top left of FIG. 4, which generates a voltage of +6 V from the 12 volts supplied by the car battery.

The monostable circuit 32 consists essentially of three transistors Q$_1$, Q$_2$ and Q$_3$. It is adjusted to a pulse width of 4.5 milliseconds by a condenser C$_o$ and a resistance R$_o$.

The ramp generator 31 consists of an operational amplifier A$_1$ and a comparator A$_2$. The frequency is adjusted to 10 hertz by a condenser C$_1$ and a resistance R$_3$. The ramp voltage values are set by resistances R$_1$ and R$_2$ for the average level and by resistances R$_4$ and R$_5$ for the peak-to-peak value.

The comparator circuit 34 consists of an operational amplifier A$_3$ followed by a DARLINGTON stage Q$_4$. By way of example: A$_1$ and A$_4$ are amplifiers of the LM 2904 type while A$_2$ and A$_3$ are of the LM 2903 type.

Figure 3:
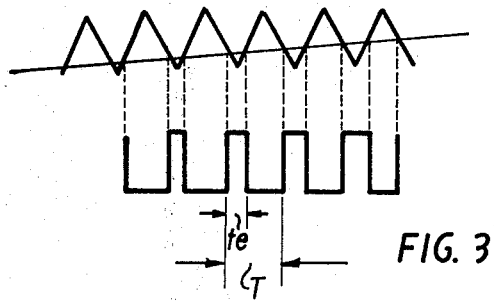
FIG. 3 illustrates the shapes of the operating curves of the electronic unit shown in FIG. 1.

The sawtooth waveform illustrated in the first line of FIG. 3 represents the shape of the signal at the output of amplifier A$_1$ of ramp generator 31. The straight line representing the vehicle's engine speed and intersecting the sawtooth signal in the first line of FIG. 3 corresponds to the signal at the output of amplifier A$_4$ of the low-pass filter 33. Finally, the signal illustrated at the bottom of FIG. 3 corresponds to that generated at the output 36 of the comparator 34 and corresponds to the input for the control and excitation circuit of the solenoid valve 23.

The principle governing the partial opening of the butterfly valves 12 in accordance with the present invention, as a function of engine speed, and especially in periods of deceleration, is thus assured by the cyclic ratio generator 24 as described above, which controls the modulated operation of the solenoid valve 23, and which in turn delivers to the chamber 17 a vacuum proportional to the electric signal entering the cyclic ratio generator 24 through the conductor 30. The cyclic ratio generator 24 produces a control signal 36 having a fixed frequency (1/T in FIG. 3) but variable pulse width ($t_e$ in FIG. 3). In the present case, T=100 ms.

The ratio $t_e/T$ produces a cyclic opening ratio R.C$_o$, which represents the ratio of the time during which the solenoid valve is excited in each period, which is 100 ms.

Figure 2:
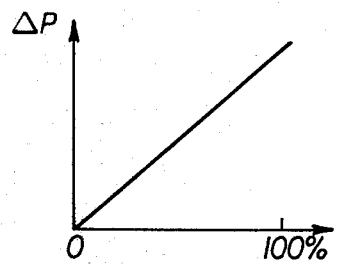
FIG. 2 illustrates the shape of the operating curve of the solenoid valve shown in FIG. 1.

The essential advantage of the device according to the present invention is that it is a proportional system, a feature which is illustrated by the curve in FIG. 2 in the form of a straight line giving the variation of the vacuum delivered to chamber 17, i.e., a quantity proportional to the vacuum in manifold 13, as a function of the cyclic ratio R.C$_o$.

The electromagnet 21 serves to maintain the butterfly valve 12 in a partially open position in transitory periods such as when the driver is moving from strong acceleration and suddenly releases the pedal, during which time the device, according to the present invention, has not yet had sufficient time to take effect.

Obviously, numerous modification and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the reduction of emissions of noxious gases from a carburetor-supplied internal combustion engine having at least one butterfly gas valve, an intake manifold, a membrane chamber, a membrane dividing said membrane chamber into first and second compartments, a three-way solenoid valve, a modulated cyclic ratio generator, a first hose, a second hose, a third hose, a fourth hose, and restriction means disposed in said fourth hose, wherein said process comprises:

communicating said first hose with said three-way solenoid valve and with said intake manifold at a first point downstream from said carburetor;

communicating said second hose with said three-way solenoid valve and with said intake manifold at a second point upstream from said carburetor;

communicating said third hose with said three-way solenoid valve and with said first compartment of said membrane chamber;

communicating said fourth hose with said second hose at a third point upstream from said carburetor and downstream from said membrane chamber such that first and second parallel fluid flow paths are effected from said solenoid valve to said second point wherein said second hose forms said first flow path and said third hose and said fourth hose form said second flow path;

generating a control signal with said modulated cyclic ratio generator in proportion to the speed of said engine;

sending said control signal to said three way solenoid valve;

actuating said solenoid valve proportional to said engine speed with said control signal;

partially opening said at least one butterfly valve via actuation of said three-way solenoid valve during deceleration of said engine such that said partial opening is proportional to both said speed of said engine and proportional to the level of vacuum in said intake manifold of said engine so as to reduce the emission of noxious gases during said deceleration of said engine.

2. A device for reducing the emission of noxious gases from a carburetor-supplied internal combustion engine having an intake manifold intended to power an automotive vehicle, comprising:

a carburetor including at least one butterfly gas valve coupled to said intake manifold of said engine, said butterfly gas valve controlling the flow of gases into said engine;

a membrane chamber coupled to said at least one butterfly gas valve and to said intake manifold, said membrane chamber including a membrane, said membrane dividing said chamber into first and second compartments, said at least one butterfly gas valve being controlled by the position of said membrane within said membrane chamber;

a three-way solenoid valve coupled to said intake manifold and to said membrane chamber, the position of said membrane in said membrane chamber being controlled by said solenoid valve;

modulated cyclic ratio generator means coupled to said three-way solenoid valve for receiving an input signal from said engine representing the speed of said engine and for generating a control signal for said three-way solenoid valve, said control signal controlling said solenoid valve relative to the speed of said engine, wherein a partial opening of said at least one butterfly gas valve is produced during periods of deceleration, said partial opening being proportional to both the speed of said engine and to the level of vacuum in said intake manifold of said engine, such that the emission of noxious gases is reduced during periods of deceleration;

a first hose coupling said three-way solenoid valve to said intake manifold, said first hose being coupled to said intake manifold at a first point downstream from said carburetor;

a second hose coupling said three-way solenoid valve to said intake manifold, said second hose being coupled to said intake manifold at a second point upstream from said carburetor;

a third hose coupling said three-way solenoid valve to said membrane chamber, said third hose communicating with said first compartment of said membrane chamber;

compensation means operatively associated with said first compartment for controlling the rest position of said membrane;

a fourth hose coupling said second hose to said third hose at a third point upstream from said carburetor and downstream of said membrane chamber such that parallel fluid flow paths are effected from said three-way solenoid valve to said second point; and a restriction means disposed in said fourth hose for assuring a return to a predetermined idle speed.

3. A device for reducing the emission of noxious gases as recited in claim 2, wherein:

said membrane chamber is coupled to said at least one butterfly gas valve by a mechanical linkage joining said gas valve to said membrane, said mechanical linkage including electromagnet means for controlling the position of said gas valve when the vacuum in said intake manifold is at a low level.

4. A device for reducing the emission of noxious gases as recited in claim 2, wherein said ratio generator means comprises:

monostable circuit means coupled to receive said input signal representing engine speed, said input signal being supplied by a breaker point assembly in an ignition circuit of said engine;

low-pass filter means coupled to the output of said monostable circuit means for filtering the signal appearing at said output;

ramp generator means for generating a continuous sawtooth shaped waveform, said waveform having a constant frequency; and compartor means coupled to receive the output signal of said low-pass filter means and said sawtooth shaped waveform output of said ramp generator means for comparing said output signals and for producing a pulse train output signal, wherein the width of each pulse in said pulse train is proportional to the speed of said engine, said pulse train output signal being the control signal for said three-way solenoid valve.

* * * * *